United States Patent [19]

Riley

[11] Patent Number: 4,943,494

[45] Date of Patent: * Jul. 24, 1990

[54] SOLID OXIDE FUEL CELL MATRIX AND MODULES

[75] Inventor: Brian Riley, Willimantic, Conn.

[73] Assignee: The United States of America as represented by the United States Department of Energy, Washington, D.C.

[*] Notice: The portion of the term of this patent subsequent to Apr. 25, 2006 has been disclaimed.

[21] Appl. No.: 184,918

[22] Filed: Apr. 22, 1988

[51] Int. Cl.⁵ .............................................. H01M 8/10
[52] U.S. Cl. ........................................ 429/30; 429/34
[58] Field of Search ....................... 429/30, 34, 38, 39

[56] References Cited

U.S. PATENT DOCUMENTS

| | | | |
|---|---|---|---|
| 4,374,184 | 2/1983 | Somers et al. | 429/17 |
| 4,395,468 | 7/1983 | Isenberg | 429/31 |
| 4,431,715 | 2/1984 | Isenberg | 429/30 |
| 4,476,196 | 10/1984 | Poeppel et al. | 429/33 |
| 4,486,400 | 12/1984 | Riley | 423/592 |
| 4,490,444 | 12/1984 | Isenberg | 429/31 |
| 4,550,066 | 10/1985 | Alexander et al. | 429/191 |
| 4,567,013 | 1/1986 | Riley | 423/593 |

*Primary Examiner*—Anthony Skapars
*Attorney, Agent, or Firm*—Hugh W. Glenn; Robert J. Fisher; William R. Moser

[57] ABSTRACT

Porous refractory ceramic blocks arranged in an abutting, stacked configuration and forming a three dimensional array provide a support structure and coupling means for a plurality of solid oxide fuel cells (SOFCs). Each of the blocks includes a square center channel which forms a vertical shaft when the blocks are arranged in a stacked array. Positioned within the channel is a SOFC unit cell such that a plurality of such SOFC units disposed within a vertical shaft form a string of SOFC units coupled in series. A first pair of facing inner walls of each of the blocks each include an interconnecting channel hole cut horizontally and vertically into the block walls to form gas exit channels. A second pair of facing lateral walls of each block further include a pair of inner half circular grooves which form sleeves to accommodate anode fuel and cathode air tubes. The stack of ceramic blocks is self-supporting, with a plurality of such stacked arrays forming a matrix enclosed in an insulating refractory brick structure having an outer steel layer. The necessary connections for air, fuel, burnt gas, and anode and cathode connections are provided through the brick and steel outer shell. The ceramic blocks are so designed with respect to the strings of modules that by simple and logical design the strings could be replaced by hot reloading if one should fail. The hot reloading concept has not been included in any previous designs.

20 Claims, 7 Drawing Sheets

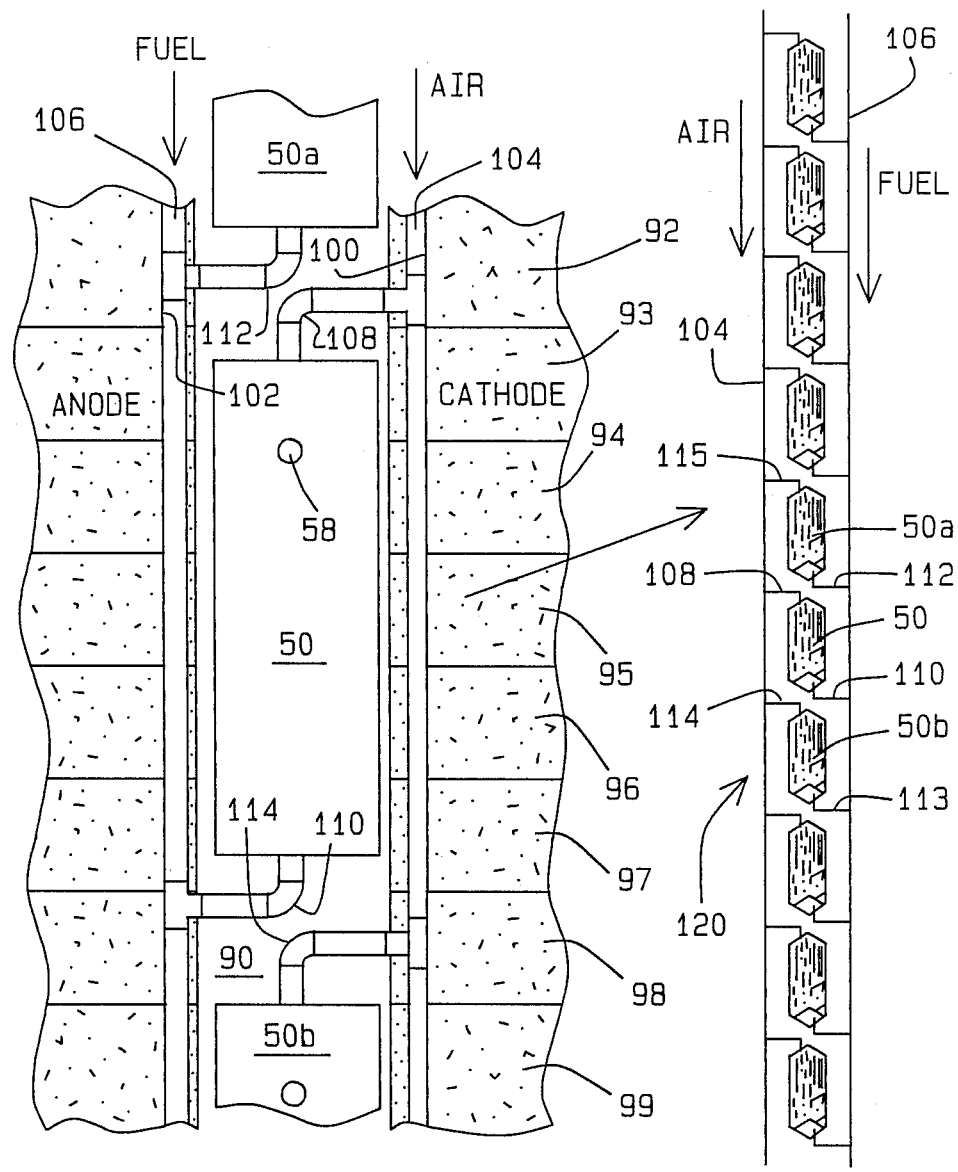

SOLID OXIDE FUEL CELL MATRIX AND MODULES

CONTRACTUAL ORIGIN OF THE INVENTION

The United States government has rights in this invention pursuant to Subcontract No. 51232401 under Prime Contract No. W-31-109-ENG-38 among the U.S. Department of Energy, the University of Chicago and Combustion Engineering, Inc., of Stamford, Ct.

BACKGROUND OF THE INVENTION

This invention relates generally to fuel cell structures and is particularly directed to a modular structure for use in a matrix array of solid oxide fuel cells.

There are several types of fuel cells currently being studied as possible alternatives for converting coal derived fuels to electricity. The three primary types of fuel cells under study are the phosphoric acid (PAFC), molten carbonate (MCFC), and solid oxide fuel cell (SOFC). The most important single factor in assessing the viability of an alternative power generating concept is its overall capital and operational cost to the user compared to the cost of conventional power generating systems. A number of factors affecting the economics of power generation based upon the fuel cell need to be considered in evaluating the commercial viability of a given fuel cell approach. One of the primary factors to be considered is the capital cost of the power generating unit of the system. The present invention is directed to a low cost SOFC matrix and modules.

The modular SOFC system is considered to be one of the viable technologies for future commercial installations. In its simplest form, an SOFC modular system is comprised of an array of ceramic based fuel cell tubes connected in series and further includes parallel configurations having the necessary fuel and air manifolds, plenum exhaust outlets, electrical interconnects, etc. All such fuel cells further include cathode, electrolyte and anode layers which are deposited upon a porous support tube with an interconnecting strip to form series and parallel electrical connections.

Such cells or stacks of cells operate at high temperatures to directly convert chemical energy of a fuel into direct current electrical energy by electrochemical combustion. This type of fuel cell utilizes a natural or synthetic fuel gas such as those containing hydrogen, carbon monoxide, methane and an oxidant such as oxygen or air. A typical SOFC reacts hydrogen fuel with oxygen from air to produce electrical energy, water vapor and heat. Cell operating temperatures are typically in the range of from 700 TM to 1100 TM C. Each cell contains an electrolyte in solid form which serves to insulate the cathode and anode from one another with respect to electron flow, but permits oxygen ions to flow from the cathode to the anode. The hydrogen reaction on the anode with oxide ions generates water with the release of electrons; and the oxygen reaction on the cathode with the electrons effectively forms the oxide ions. Electrons flow from the anode through an appropriate external load to the cathode, and the circuit is closed internally by the transport of oxide ions through the electrolyte.

However, even the modular SOFC system presents a substantial challenge to the fuel cell designer in developing a commercially feasible fuel cell. For example, prior art SOFC approaches have required complicated cell support arrangements which make use of many interconnected components. In addition, the manner in which the individual cells are electrically coupled together as well as to a power output line has also resulted in overly complicated electrical connections. In addition to the aforementioned support and electrical coupling complexities, SOFC installations also must accommodate the fuel and oxidant gas inlet lines as well as an exhaust arrangement for discharging the burnt gases. These three considerations have complicated fuel cell design and substantially increased fuel cell costs. The present invention addresses the aforementioned limitations of prior art SOFCs by providing a fuel cell arrangement which is easily fabricated and assembled, makes use of low cost components, employs an integrated and common manifolding, bussing and structural support construction which allows for a substantial reduction in the cost of such fuel cells and greatly enhances their commercial feasibility.

OBJECTS AND SUMMARY OF THE INVENTION

Accordingly, it is an object of the present invention to provide a building block structure for a solid oxide fuel cell (SOFC).

It is another object of the present invention to provide an SOFC module arrangement for repetitive use in a stacked matrix array of such fuel cells.

A further object of the present invention is to provide a self-supporting, self-contained SOFC module adapted for arrangement in a stacked, matrix array of such modules coupled together in series as well as in parallel.

A still further object of the present invention is to provide an SOFC design and construction which includes a plurality of stacks of ceramic blocks containing built-in channels for fuel, air and burnt gas flow.

Yet another object of the present invention is to provide a support structure for an SOFC which incorporates integrated fuel, air and burnt gas flow conduits and which is adapted for enclosure in a brick insulating structure having an outer steel shell.

This invention contemplates a modular SOFC arrangement comprising an SOFC having an anode, a cathode and a solid electrolyte therebetween and responsive to an oxidant and a fuel gas provided thereto for converting chemical energy of the fuel gas to direct current electrical energy. The modular SOFC arrangement further includes block means coupled to the SOFC for providing support therefor, wherein the block means includes fuel and oxidant gas delivery means for respectively providing fuel gas and oxidant to the fuel cell and further includes exhaust means for removing exhaust gas from the SOFC.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a partially cutaway perspective view of a prior art SOFC module containing a plurality of fuel cell tubes as shown in FIG. 1 which the present invention is intended for use with;

FIG. 4 is a sectional view of an SOFC installation in accordance with the present invention;

FIG. 5 is a sectional view in simplified schematic diagram form of a string of SOFC modules as illustrated in FIG. 4 in accordance with the present invention;

DETAILED DESCRIPTION OF THE PREFERRED EMBODIMENT

Figure 1:
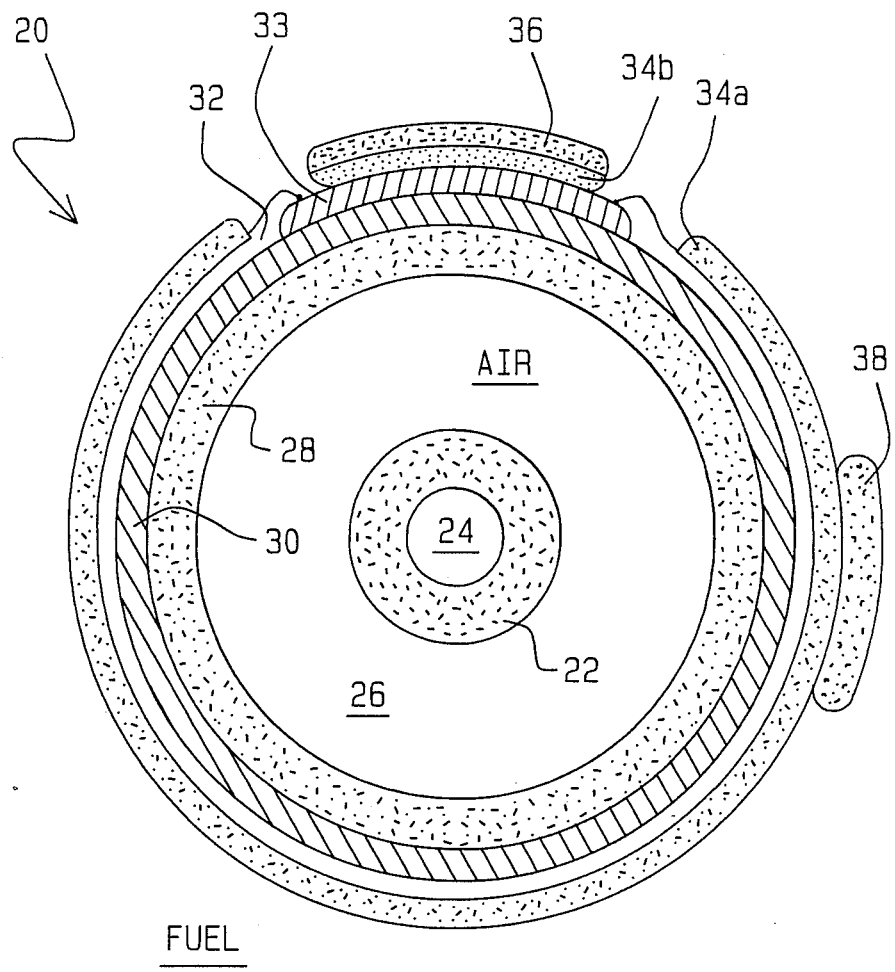
FIG. 1 is a cross sectional view of a prior art solid oxide fuel cell tube with which the SOFC matrix and modules of the present invention are particularly adapted for use.
Figure 2:
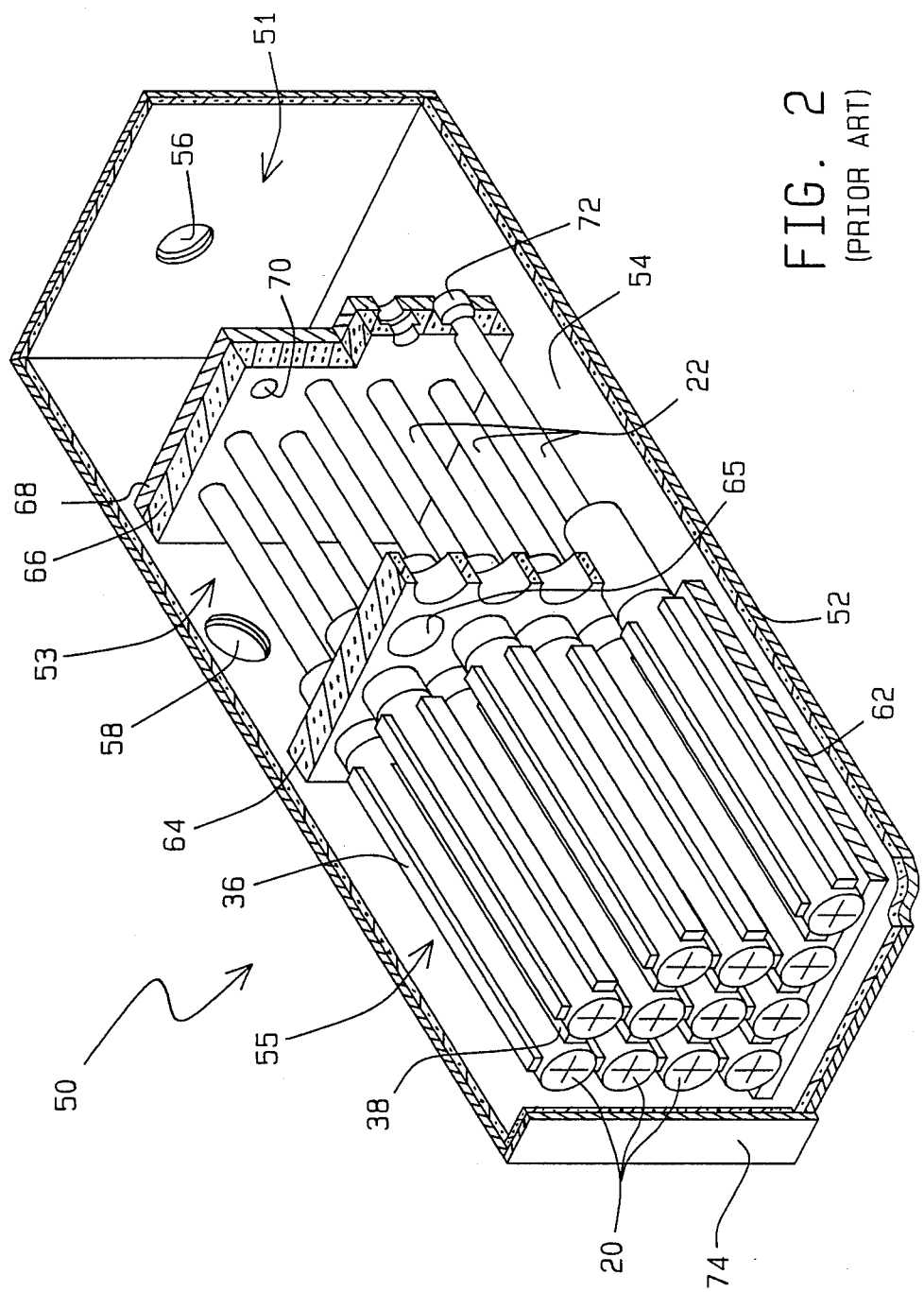

Referring to FIGS. 1 and 2, there are respectively shown a cross sectional view of a tube 20 used in a prior art SOFC and a partially cutaway perspective view of a bundle of such SOFC tubes connected in series and parallel to form a module 50. The present invention is designed to accommodate the prior art SOFC tube and module shown in these figures and briefly described in the following paragraphs.

The SOFC tube 20 includes an inner air jet tube 22 defining an air inlet 24 into which air or another oxygen bearing gas is introduced. Disposed about the air jet tube 22 in a spaced, concentric manner is a support tube 28. Between the air jet tube 22 and the support tube 28 is an annular air outlet 26. The support tube 28 is preferably comprised of calcia stabilized zirconia which is porous and is provided with three outer layers deposited thereon. The first outer layer deposited upon the support tube 28 is that of an air electrode 30 which extends around the entire circumference of the support tube 28. The air electrode 30 is preferably comprised of a strontium doped lanthanum manganite-zirconia mixture. The next outer layer is an electrolyte 32 disposed upon the air electrode 30 and extending substantially around the entire circumference thereof. The final layer is that of a fuel electrode which includes two separate sections designated by numerals 34a and 34b. A first section of the fuel electrode 34a is disposed upon the electrolyte 32 and extends around a substantial portion of the circumference thereof, while a second fuel electrode section 34b is disposed upon an interconnector 33 positioned upon that portion of the air electrode 30 upon which is not disposed the electrolyte. A series interconnector pad 36 is positioned on the second fuel electrode section 34b, while a parallel interconnector pad 38 is positioned upon a portion of the first fuel electrode section 34a. The series and parallel interconnector pads 36, 38 are positioned approximately 90 TM from one another about the outer periphery of the SOFC tube 20 and are preferably comprised of nickel felt. The interconnector 33 is a strip preferably comprised of magnesium doped lanthanum chromite which connects with the air electrode 30 and brings the cathode current to the surface where series connections can be made between SOFC tubes. The electrolyte 32 is a thin impervious coating of yttria stabilized zirconia through which oxygen ions generated at the cathode diffuse and subsequently interact with hydrogen gas at the anode interface to form water as a by-product. The electrolyte layer 32 together with the interconnector 33 forms a sealed envelope to prevent molecular oxygen from diffusing through the layers to chemically react with the molecular hydrogen, thereby avoiding a chemical short and lowering cell efficiency.

The air jet tube 22, which is typically comprised of 98% alumina, is an open ended, thin walled tube which directs the combustion air, or another oxidant, to a closed end of the porous support tube 28. The porous support tube 28 serves as an oxidant gas envelope while supporting the thin layers of electrodes, electrolyte and intereconnects. During operation, air flows through the center of the SOFC tube 20 and fuel passes over its exterior. Oxygen from the air diffuses through the porous support tube 28 and the air electrode 30 (cathode), while fuel diffuses through the fuel electrode (anode). These process media electrochemically react through the electrolyte 32, generating products such as water vapor, carbon dioxide, heat and electrical energy. The high temperature water vapor and carbon dioxide are carried away from the cell with, for example, unburned fuel, and electrical power is transferred in series from the inner air electrode 30 of one cell to the outer fuel electrode of the next cell.

FIG. 2 is a partially cutaway perspective view of a plurality of such SOFC tubes 20 each forming elongated, cylindrical fuel cells arranged in a bundle to form an SOFC module 50. The SOFC module 50 includes an air inlet preheat chamber 51, a lean fuel after burning chamber 53, and a fuel cell housing chamber 55. The SOFC module 50 includes a generally rectangular, closed outer housing 52 preferably comprised of stainless steel. Disposed on the inner surface of the outer housing 52 is an inner insulation 54 preferably comprised of alumina ($Al_2O_3$ or mullite). Positioned within the outer housing 52 and inner insulation 54 and separating the air inlet preheat chamber 51 and the lean fuel after burning chamber 53 is a generally planar sheet comprised of a layer of alumina felt perforated pad 66 and a stainless steel perforated plate 68. Positioned within the outer housing 52 and between the SOFC module's lean fuel after burning chamber 53 and inner fuel cell housing chamber 55 is a porous wall 64 having a plurality of spaced apertures 65 therein. An oxidant gas such as air is introduced into the inlet preheat chamber 51 via an inlet aperture 56 in one end of the SOFC module's outer housing 52. The temperature of the oxidant gas is increased in the preheat chamber 51, with the heated air then flowing through a plurality of air jet tubes 22 within the after burning chamber 53. A first end of each of the air jet tubes 22 is inserted in a respective aperture 70 within the alumina felt perforated pad 66 and stainless steel perforated plate 68. An alumina expansion ring 72 is disposed over the first end of each of the air jet tubes 22 and provides a tight seal between each of the tubes and the felt and stainless steel perforated plate combination. Each of the air jet tubes 22 is continuous with and coupled to a respective SOFC tube 20 within the fuel cell housing chamber 55. Each of the SOFC tubes 20 extends through a respective aperture 65 within the porous wall 64. Each of the SOFC tubes 20, except for those positioned outermost, or around the periphery of the module, has a respective pair of series interconnector pads 36 and parallel interconnector pads 38 coupled thereto. The oxidant gas which flows through the air jet tubes 22 continues to flow to the end of a calcia-stabilized zirconia SOFC tube 20, allowing the oxidant gas to pass through a porous support tube in each of the SOFC cells as previously described. The partitions within the SOFC module 50 serve as porous-insulator barriers and support for the alumina air jet and generator tubes.

The fuel, on the other hand, is directed into the SOFC module 50 via an aperture (not shown) in the opposite end from that of the oxidant inlet aperture 56. The fuel ($CO/H_2$) thus flows through the base 74 of the SOFC module 50 and over the outer fuel electrode of each of the SOFC tubes 20 to react with the oxygen ions at the electrolyte interface. Lean fuel diffuses through the porous wall (preferably comprised of barrier board), and then burns with the excess air which leaves the inside of each of the porous tubes to exit as hot gas for co-generation. Burned gas flows out of the SOFC module 50 via a pair of burned gas outlets 58 in the after burning chamber 53. Electrical current generated by the matrix of SOFC tubes 20 when connected in series and in parallel by the aforementioned interconnector pads is removed from the SOFC module 50 by two conductor metal plates or pads 62 which span the bottom of the housing 52, as shown in FIG. 2, and make contact with the fuel electrodes (anode) and span the top facing wall of the module housing and make contact with the air electrodes (cathode) of the SOFC tubes through the interconnector described above with respect to FIG. 1. It should be noted that the upper conductor metal plate is not shown in FIG. 2 for simplicity.

Figure 3:
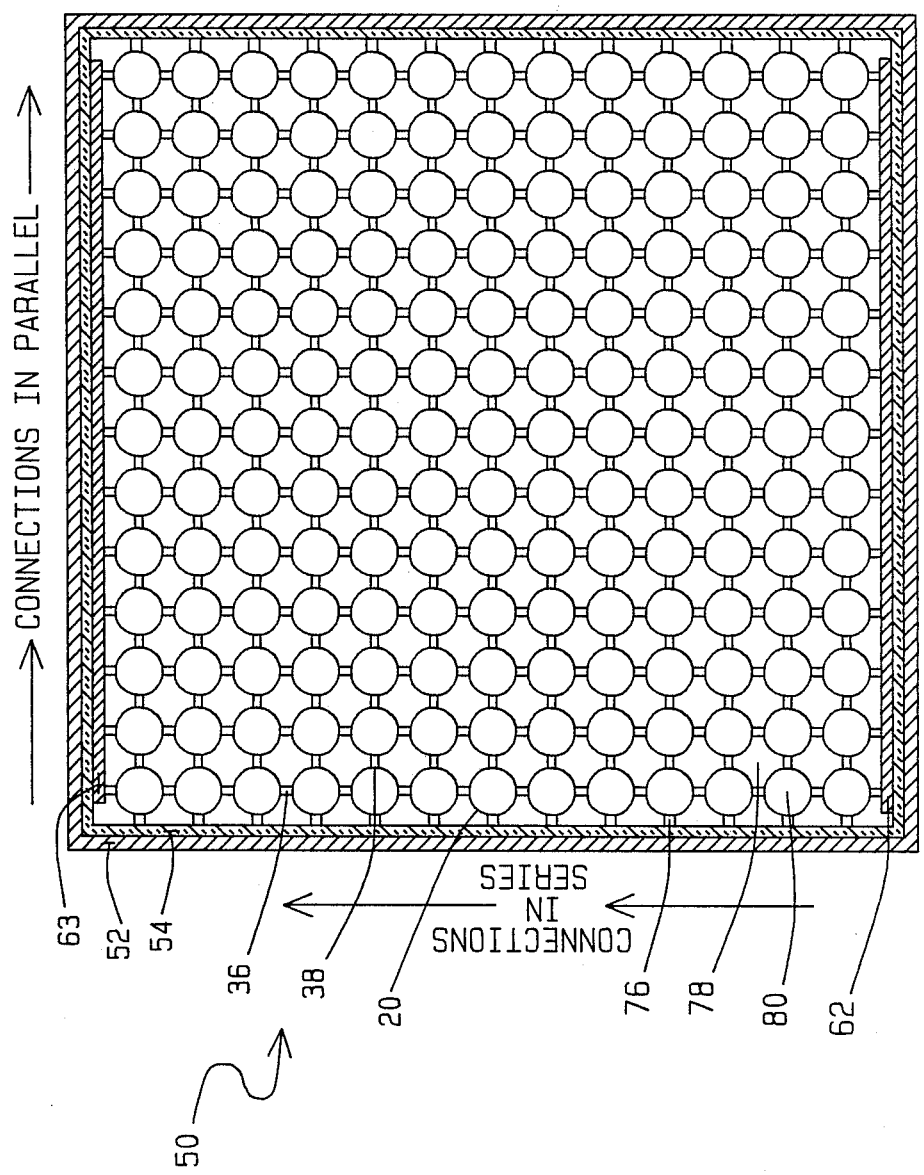
FIG. 3 is a cross sectional view of the SOFC module shown in FIG. 2 which includes a 14×14 matrix of SOFC tubes.

Referring to FIG. 3, there is shown a cross sectional view of the SOFC module matrix 50 of FIG. 2. Each of the SOFC tubes 20 is coupled to either four adjacent SOFC tubes or to the lower conductor plate/pad (anode) 62 or to the upper conductor plate/pad (cathode) 63. An alumina felt pad 76 is positioned between and in contact with the inner insulation layer 54 of the module's housing and with each of the SOFC tubes 20 positioned along the facing, lateral surfaces of the SOFC module 50. As shown in the figure, each of the series interconnector pads 36 are arranged in a generally vertical array, while the parallel interconnector pads 38 are aligned generally horizontally across the SOFC module 50. The connections in parallel run generally across the width of the SOFC module 50, while the connections in series run generally vertically in the SOFC module as shown by the arrows in FIG. 3. The space within each of the SOFC tubes 20 defines an air channel 80, while the space between adjacent SOFC tubes defines a fuel channel 78. The alumina felt pads 76 are electrically insulated from the outer housing 52 by the sprayed layers of insulation 54 within all of the inside walls of the SOFC module 50. The upper cathode plate/pad 63 connects all of the SOFC tube cathode interconnectors in parallel, while the lower anode conductor plate/pad 62 connects all of the SOFC tube anode interconnectors in parallel. The cathode and anode felt pads are welded to the interconnector bus bars and then to the manifold in providing a path for the current generated by each of the SOFC tubes 20.

Figure 8:
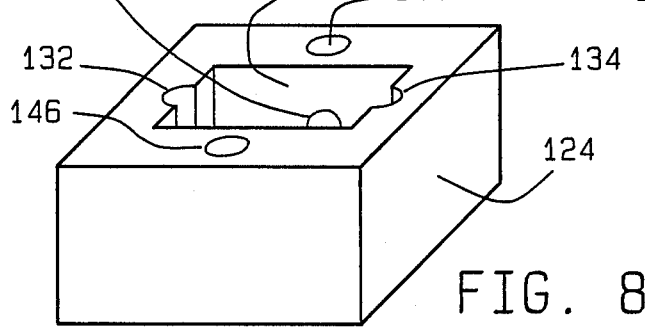
FIG. 8 is a perspective view of a ceramic block used in forming an SOFC matrix and module in accordance with the present invention.

Referring to FIG. 4, there is shown a sectional view of an SOFC module installation in accordance with the present invention. The SOFC module 50 is positioned lengthwise within and along the length of a square shaft 90 defined by the apertures within a plurality of ceramic blocks 92 through 99 arranged in a stacked configuration. A stacked array of such SOFC modules is shown in simplified schematic diagram form in FIG. 5, while a perspective view of a single block 124 is shown in FIG. 8. Each of the blocks 92 through 99 includes a generally square, center slot, or aperture, 126 as shown in block 124 illustrated in FIG. 8. With the blocks 92 through 99 arranged in a linear, stacked array as shown in FIG. 4, each of the center apertures of the blocks is in alignment so as to define a square shaft 90 extending the length of the stacked, aligned blocks. Positioned lengthwise within the shaft 90 are a plurality of SOFC modules 50, 50a and 50b.

Each of the blocks, as shown in FIG. 8 for the case of block 124, includes first and second notches 132, 134 in facing, inner portions of the block which define a portion of the aperture 126 therein. Each of the first and second notches 132, 134 has a generally semi-circular cross section and extends from the top to the bottom of the block in a linear manner. When the blocks 92 through 99 are arranged in a stacked array as shown in FIG. 4, their respective first and second notches are placed in alignment so as to provide the stacked array with first and second tube sleeves 100, 102 extending the entire length of the stacked array of blocks. The first and second tube sleeves 100, 102 form respective notches in facing portions of the square shaft 90 and extend the entire length of the shaft. The first tube sleeve 100 is adapted to receive an anode/fuel tube 106, while the second tube sleeve 102 is adapted to receive a cathode/air tube 104. The anode/fuel tube 106 is coupled to each of the SOFC modules 50, 50a and 50b within the square shaft 90 by means of a respective L-shaped fuel coupling/support member 110, 112 and 113. Each of the fuel coupling/support members 110, 112 and 113 is comprised of a rigid, high temperature resistant and electrically conductive alloy such as alumina. A gaseous fuel under pressure delivered to the anode/fuel tube 106 is directed into the fuel cell housing chamber in a lower portion of each of the SOFC modules 50, 50a and 50b.

In a similar manner, the cathode/air tube tube 104 disposed within the first tube sleeve 100 and extending along the length of the square shaft 90 is adapted to receive a cathode/air tube 104. The cathode/air tube 104 is coupled to each of the SOFC modules 50, 50a and 50b within the square shaft 90 by means of a respective air coupling/support member 108, 115 and 114. With an oxidant such as air delivered under pressure to the cathode/air tube 104, the air is provided to an air inlet preheat chamber within an upper portion of each of the SOFC modules 50, 50a and 50b. As in the case of the fuel coupling/support members, each of the air coupling/support members 108, 114 and 115 is comprised of a rigid, high temperature resistant and electrically conductive alloy such as alumina. The combination of the cathode/air tube 104 and air coupling/support members 108, 114 and 115 not only deliver an oxidant gas to each of the SOFC modules, but also provide support for each of the modules.

In addition, each of the air coupling/support members 108, 114 and 115 is coupled to the respective cathode elements within the SOFC modules 50, 50b and 50a such that the cathode/air tube 104 functions as a current conductor in the stacked array of SOFC modules. Similarly, the anode/fuel tube 106 is coupled by means of the fuel coupling/support members 110, 112 and 113 to the anodes of SOFC modules 50, 50a and 50b, respectively. Thus, the anode/fuel tube 106 also functions as a current conductor in the stacked SOFC module array. It should be noted in comparing FIGS. 4 and 5, that the string arrangement 120 of SOFC modules of FIG. 5 is viewed from the opposite direction than the view of the stacked array of SOFC modules shown in FIG. 4. Thus, the fuel coupling support members 110, 112 and 113 extend to the right in FIG. 5 rather than to the left as shown in FIG. 4, while the air coupling/support members 108, 114 and 115 extend to the left in FIG. 5, rather than to the right as illustrated in FIG. 4. FIG. 5 shows that a large number of SOFC modules may be arranged in a vertically stacked array, with the cathode/air and anode/fuel tubes 104, 106 in combination with the plurality of air and fuel coupling/support members providing support for each of the SOFC modules, directing fuel and oxidant gases into each of the modules in initiating and sustaining the electrochemical combustion of the fuel, and providing current conducting paths from each of the SOFC modules to permit the DC power generated by the electrochemical combustion to be removed from the SOFC string arrangement 120.

Figure 6:
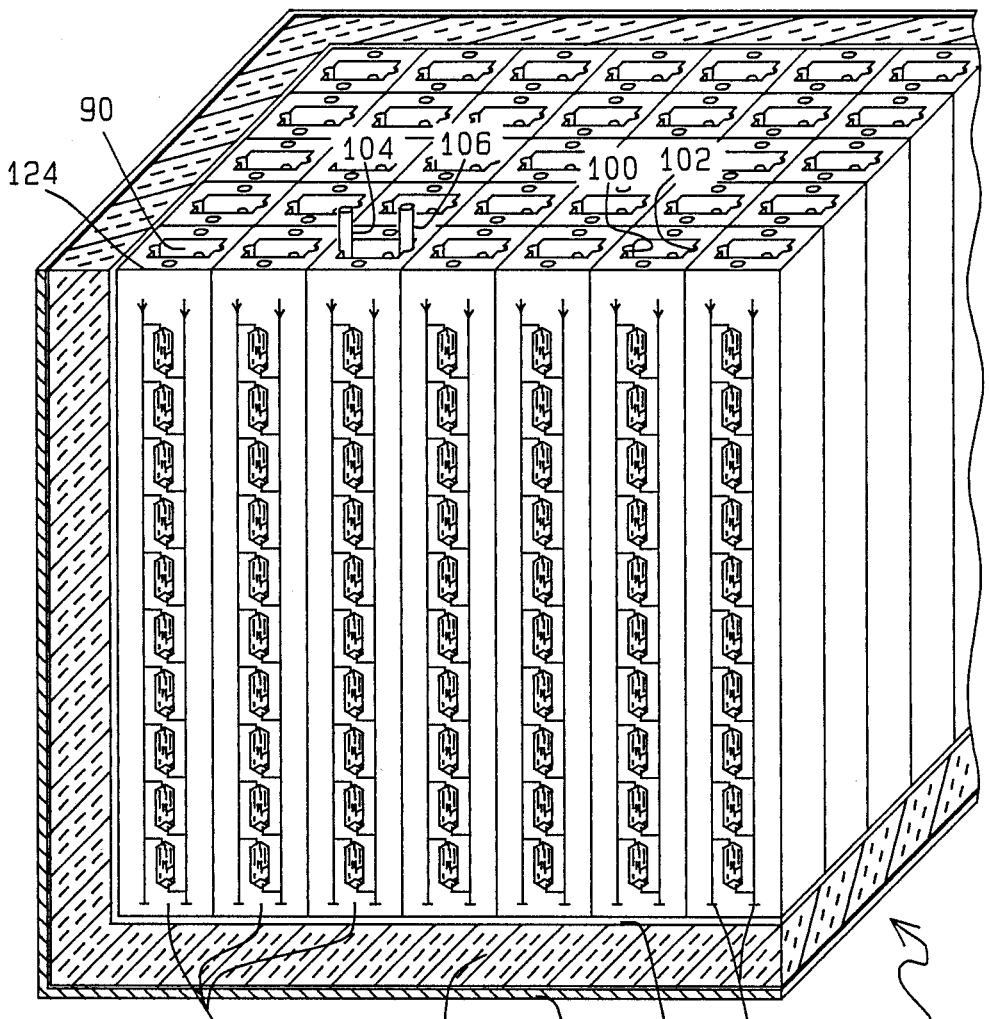
FIG. 6 shows a 3-dimensional matrix of SOFC modules in accordance with the present invention.

Referring to FIG. 6, there is shown a partially cutaway perspective view of a matrix 122 comprised of a plurality of stacked, string arrangements 120 of the SOFC modules previously described. A pair of cathode/air and anode/fuel tubes 104, 106 are illustrated, it being understood that each stacked array of blocks 124 is provided with a similar pair of tubes coupled to a plurality of SOFC modules positioned within the square, elongated shaft 90 defined by the stacked array of blocks. Each of the cathode/air tubes 104 is positioned within a respective first tube sleeve 100, while each of the anode/fuel tubes 106 is positioned within a facing, second tube sleeve 102. The matrix 122 of SOFC string arrangements 120 is positioned within an outer housing or shell 138 preferably comprised of steel. Positioned between the SOFC string arrangements 120 and the outer steel housing 138 is an insulating layer 136 preferably comprised of a brick-like material. The lower ends of each of the cathode/air and anode/fuel tubes 104, 106 are provided with support feet 140 which are positioned upon a generally flat, rigid floor or bottom panel 141 within the SOFC matrix 122. The string support feet 140 provide for the stable positioning of the fuel and oxidant tubes as well as the SOFC modules coupled thereto within the SOFC matrix 122. The string arrangement 120 of SOFC modules may be comprised of a plurality of stacked ceramic blocks as previously described, or may include a single, elongated, hollow ceramic support structure as illustrated in FIG. 6.

Figure 7:
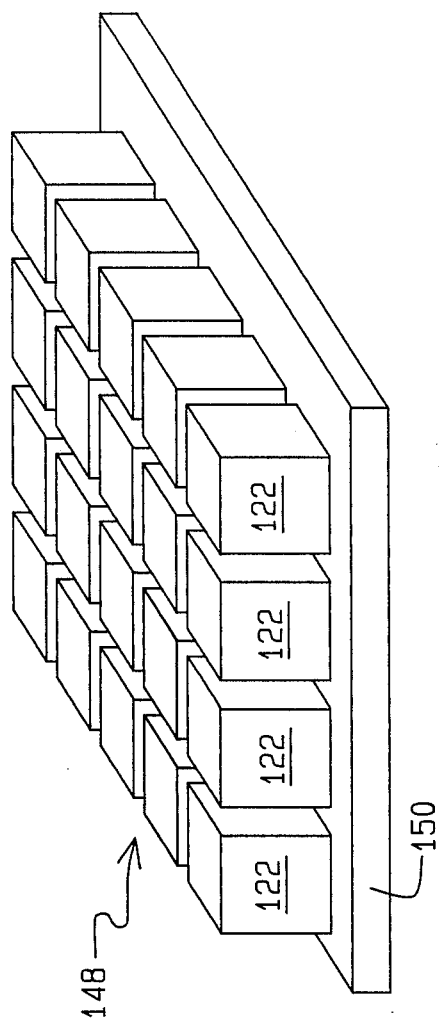
FIG. 7 illustrates a plurality of SOFC matrices such as shown in FIG. 6 arranged to form an SOFC plant.

A plurality of SOFC matrices 122 may be positioned upon and mounted to a support structure 150 as shown in FIG. 7 to form an SOFC plant 148. With regard to energy production, individual solid oxide fuel cell tubes capable of producing 20 W of power are contemplated for use in the present invention, with these individual SOFC tubes combined in a 14×14 array to form an SOFC module capable of producing 10 KW. The modules of 14×14 SOFC tubes are contemplated for arrangement in 10 MW matrices which, in turn, can be combined to form a 200 MW SOFC plant.

As described above, each of the SOFC modules 50 includes a pair of burnt gas outlets 58 in facing, lateral walls of the module. The burnt gas outlets 58 allow exhaust gases to escape from the SOFC module and flow into the shaft 90 defined by the aligned apertures in the stacked array of blocks 92 through 99. As shown in FIG. 8, the facing inner surfaces of the block 124 include first and second exhaust gas outlets 142. Each of the exhaust gas outlets 142 is coupled to and continuous with a respective one of a first and second exhaust gas manifolds 144, 146 within a lateral wall of the block 124. With a plurality of blocks arranged in a stacked array, the first and second gas manifolds 144, 146 of each block are arranged in common alignment so as to form a pair of exhaust gas manifolds within facing walls of the blocks and extending the length of a string arrangement of SOFC modules. Flow of the exhaust gases produced as a result of the electrochemical combustion within each of the SOFC modules from the elongated, linear shaft 90 through the paired exhaust gas outlets 142 and into the first and second exhaust gas manifolds 144, 146 allows these exhaust gases to be removed from the SOFC modules.

Figure 9:
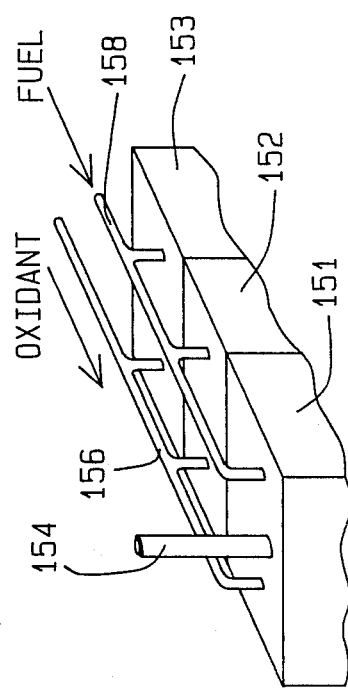
FIG. 9 is a perspective view of the top of an SOFC matrix illustrating the air, fuel and burnt exhaust gas connections thereto in accordance with the present invention.

Referring to FIG. 9, there is shown a perspective view of the top of three stacked arrays of SOFC modules which respectively include top blocks 151, 152 and 153, each comprised of refractory brick. Each of the blocks 151, 152 and 153 includes a pair of apertures, with one of the apertures coupled to an oxidant gas line 156 and the other aperture coupled to a fuel gas line 158. In this manner, an oxidant gas as well as a fuel gas can be delivered to a plurality of SOFC modules arranged in a stacked array and enclosed within and surrounded by a self-supporting brick or ceramic structure. Also coupled to an aperture within the top surface of each of the top blocks 151, 152 and 153 is a hot gas exhaust tube 154, although for simplicity a hot gas exhaust tube is only shown coupled to and mounted on block 151. The hot gas exhaust tube 154 is coupled to each of the exhaust gas manifolds within the stacked array of SOFC modules of which block 151 is the topmost brick. It is in this manner that the hot exhaust gases are vented from each stacked array of SOFC modules. The hot exhaust gases may be provided to a co-generator plant for conversion to a more readily usable form of energy.

Figure 10:
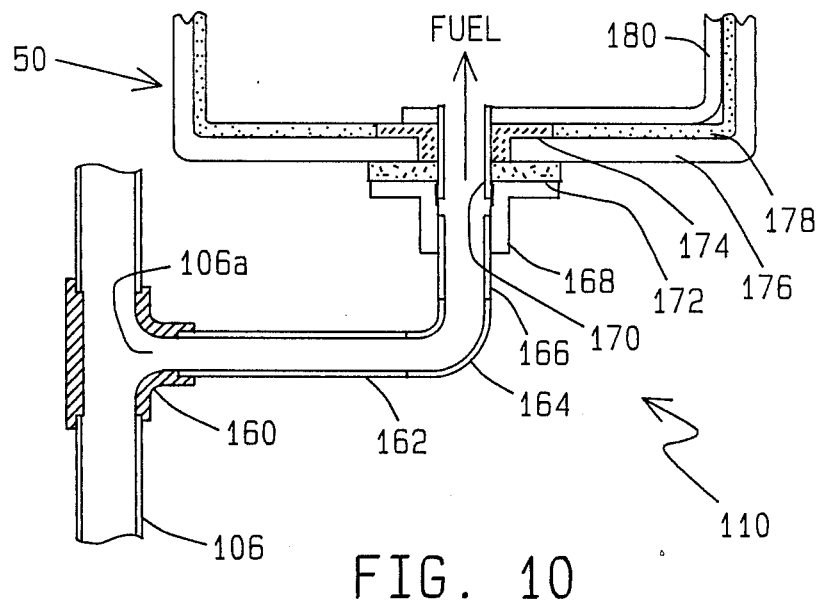
FIG. 10 is a sectional view illustrating the details of the manner in which fuel is provided to an SOFC module in accordance with the present invention.

Referring to FIG. 10, there is shown the details of the manner in which an SOFC module 50 is coupled to and supported by an anode/fuel tube 106. With the anode/fuel tube 106 positioned within one of the facing notches on a lateral, inner surface of a SOFC module block, a straight tube 162 is coupled to an aperture 106a in the anode/fuel tube by means of a T-connector 160. An L-bend 164 is attached to the distal end of the straight tube 162 and is oriented generally vertical in an upward direction. A manifold connector 166 is then attached to the distal end of the L-bend 164 and a support flange 168 is positioned about the open, distal end of the manifold connector. The SOFC module 50 includes the previously described outer housing 176 which is lined with an insulation layer 178. The lower wall of the SOFC module's housing 176 includes an aperture therein through which extends and in which is positioned an insulating collet 174. Positioned within the insulating collet 174 in a tight fitting manner is a cylindrical flange connector 170 having a threaded distal, or lower, end portion. The upper, or proximal, end of the flange connector 170 is coupled to and in contact with an anode connector bar 180 which lines a portion of an inner surface of the SOFC module 50. The anode connector bar 180 is coupled to the anode electrodes within the SOFC module 50. The aforementioned support flange 168, which includes a threaded inner portion, is securely attached to the threaded end portion of the flange connector 170, with an insulating spacer 172 positioned in tight fitting relation between the support flange and the lower wall of the SOFC module's housing 176. The insulating collet 174 is preferably comprised of a ceramic material and insulates the SOFC module's housing 176 from the current carrying anode fuel coupling/support member 110.

Figure 11:
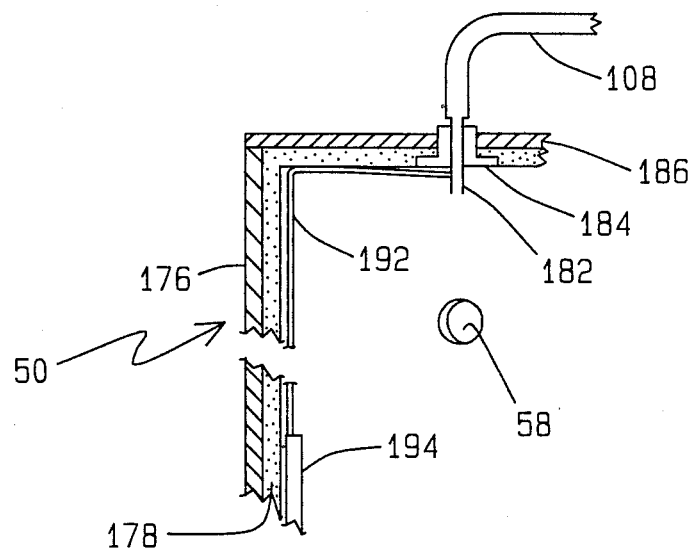
FIG. 11 is a partial sectional view illustrating the manner in which an oxidant gas is delivered to an SOFC module in accordance with the present invention.

Referring to FIG. 11, there is shown a sectional view illustrating the details of the manner in which the cathode air coupling/support member 108 is coupled to an SOFC module 50 for providing an oxidant gas to the module. The structural details of the cathode air coupling/support member 108 are similar to those of the anode fuel coupling/support member 110 illustrated in FIG. 10. The cathode air coupling/support member 108 is therefore coupled to a flange connector 182 inserted through a support flange 184 which is securely positioned in an aperture in the upper wall of the SOFC module's housing 176. The support flange 184 provides electrical insulation between the inside of the SOFC module and the cathode air coupling/support member 108 and the module's housing 176. The proximal end of the conductive flange connector 182 is coupled to a cathode nickel felt plate 194 by means of a cathode connector bar 192. The cathode nickel felt plate 194 is positioned adjacent to an inner, lateral wall of the SOFC module 50 and is coupled to the cathode electrodes within the module. A similar anode nickel felt plate is provided for on the inner, right hand wall of the SOFC module 50 illustrated in FIG. 10, although it is not shown for simplicity and is further coupled to the anode connector bar 180. The structural and connection details of the air coupling/support member 108, which is coupled to the flange connector 182, are the same as those of the fuel coupling support member 110, but are not shown in FIG. 11 for simplicity. Facing lateral walls of the SOFC module 50 are provided with respective burnt gas outlets 58 as previously described and as illustrated in FIG. 11.

There has thus been shown a solid oxide fuel cell matrix and module which is self supporting, self contained and of minimal size to provide an efficient, high energy density source of DC current. The solid oxide fuel cell module includes a ceramic block enclosure which serves to support a bundle of solid oxide fuel cells by means of fuel and oxidant gas supply tubes. The support block structure accommodates the fuel and oxidant gas supply tubes in a space saving manner and includes an integrated exhaust gas manifold for the removal of burnt exhaust gases from the solid oxide fuel cell. The present invention is particularly adapted for arranging the solid oxide fuel cells in a linear, stacked array, with modules of solid oxide fuel cells electrically coupled in series, and for further arranging the stacked arrays in a large, 3-dimensional matrix for facilitating the generation of large power outputs. The ceramic blocks are so designed with respect to the strings of modules that by simple and logical design the strings could be replaced by hot reloading if one should fail. The hot reloading concept has not been included in any previous designs.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of this invention in which an exclusive property or privilege is claimed are defined as follows:

1. A modular solid oxide fuel cell arrangement comprising:
   a solid oxide fuel cell having an anode, a cathode and a solid electrolyte therebetween and responsive to an oxidant and a fuel gas provided thereto for converting chemical energy of said fuel gas to direct current electrical energy; and
   block means coupled to said solid oxide fuel cell for providing support therefor, said block means including fuel and oxidant delivery means for respectively providing fuel gas and oxidant to said fuel cell and further including exhaust means for removing exhaust gases from said solid oxide fuel cell.

2. The modular solid oxide fuel cell arrangement of claim 1 wherein said block means comprises a ceramic block.

3. The modular solid oxide fuel cell of claim 2 wherein said ceramic block is of low density and is heat treated to on the order of 1600 C.

4. The modular solid oxide fuel cell arrangement of claim 1 wherein said block means includes a center aperture extending therethrough and within which is disposed said solid oxide fuel cell.

5. The modular solid oxide fuel cell arrangement of claim 4 wherein said center aperture is generally square in cross section.

6. The modular solid oxide fuel cell arrangement of claim 4 wherein said fuel and oxidant delivery means respectively comprise first and second tubes coupled to said solid oxide fuel cell and disposed within said block means.

7. The modular solid oxide fuel cell arrangement of claim 6 wherein said block means includes first and second inner sleeves adapted to receive said first and second tubes, respectively.

8. The modular solid oxide fuel cell arrangement of claim 7 wherein each of said first and second tubes are circular in cross section and wherein each of said first and second sleeves is generally semi-circular in cross section and extend outward from the center aperture of said block means.

9. The modular solid oxide fuel cell arrangement of claim 4 wherein said exhaust means comprises a gas manifold continuous with and coupled to the center aperture of said block means for removing exhaust gases discharged from said solid oxide fuel cell into the center aperture of said block means.

10. The modular solid oxide fuel cell arrangement of claim 9 wherein said gas manifold is disposed within facing lateral portions of said block means and extends through said block means from top to bottom.

11. The modular solid oxide fuel cell arrangement of claim 10 wherein said gas manifold includes first and second exhaust gas inlets on respective facing portions of said block means defining the center aperture therein and continuous with said center aperture and wherein said exhaust gas inlets extend through said block means from top to bottom.

12. The modular solid oxide fuel cell arrangement of claim 1 further comprising a plurality of stacked solid oxide fuel cells arranged end-to-end and a plurality of block means arranged in a linear array within which are disposed the stacked solid oxide fuel cells.

13. The modular solid oxide fuel cell arrangement of claim 12 further comprising a plurality of stacked solid oxide fuel cells and linearly arranged block means forming a matrix with the block means of adjacent solid oxide fuel cell stacks arranged in abutting contact.

14. The modular solid oxide fuel cell arrangement of claim 13 further comprising a metal housing enclosing the matrix of stacked solid oxide fuel cells.

15. The modular solid oxide fuel cell arrangement of claim 14 wherein said metal housing is comprised of steel.

16. The modular solid oxide fuel cell arrangement of claim 14 further comprising an insulating layer disposed between the matrix of stacked solid oxide fuel cells and said metal housing.

17. The modular solid oxide fuel cell arrangement of claim 16 wherein said insulating layer is comprised of brick.

18. The modular solid oxide fuel cell arrangement of claim 14 further comprising first and second connecting means for respectively coupling the anodes and cathodes of each of said stacked solid oxide fuel cells in series, wherein said first and second connecting means extend through said metal housing.

19. The modular solid oxide fuel cell arrangement of claim 14 further comprising a plurality of exhaust tubes extending through said metal housing and each respectively coupled to the exhaust means of a plurality of stacked solid oxide fuel cells.

20. The modular solid oxide fuel cell arrangement of claim 1 wherein said fuel and oxidant delivery means are electrically conductive and respectively form an anode and a cathode bus.

* * * * *